United States Patent
Verbil et al.

(10) Patent No.: US 11,616,750 B1
(45) Date of Patent: Mar. 28, 2023

(54) PLATFORM-AGNOSTIC MESSAGE RELAY SERVICE FOR INBOUND MESSAGES

(71) Applicant: CenturyLink Intellectual Property LLC, Broomfield, CO (US)

(72) Inventors: John Verbil, Scottsdale, AZ (US); Richard Cerami, Denver, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/976,917

(22) Filed: Oct. 31, 2022

Related U.S. Application Data

(62) Division of application No. 17/100,024, filed on Nov. 20, 2020, now Pat. No. 11,496,423.

(60) Provisional application No. 62/938,076, filed on Nov. 20, 2019.

(51) Int. Cl.
*H04L 51/224* (2022.01)

(52) U.S. Cl.
CPC .................................. *H04L 51/224* (2022.05)

(58) Field of Classification Search
CPC ..................................................... H04L 51/224
See application file for complete search history.

(56) References Cited

U.S. PATENT DOCUMENTS

| | | | |
|---|---|---|---|
| 2005/0020250 A1 | 1/2005 | Chaddha | |
| 2010/0185740 A1* | 7/2010 | Lee | H04L 67/63 709/206 |
| 2010/0211783 A1 | 8/2010 | Lukaszyk | |
| 2011/0047483 A1 | 2/2011 | Low | |
| 2011/0113233 A1 | 5/2011 | Hirota | |
| 2011/0289170 A1 | 11/2011 | Smith | |
| 2012/0311046 A1* | 12/2012 | Grigoriev | H04L 67/303 709/206 |
| 2015/0081799 A1* | 3/2015 | Fernandez-Gil | H04L 51/42 709/206 |
| 2016/0147782 A1* | 5/2016 | Roseman | G06F 16/16 707/822 |
| 2018/0097901 A1* | 4/2018 | Ramachandra | H04W 4/14 |
| 2018/0352395 A1 | 12/2018 | Ruttenbur | |
| 2019/0057204 A1 | 2/2019 | Marcovecchio | |
| 2019/0215375 A1* | 7/2019 | Ragsdale | H04L 9/0894 |

(Continued)

FOREIGN PATENT DOCUMENTS

AU     2003205033     7/2004

*Primary Examiner* — Johnny B Aguiar

(57) ABSTRACT

Examples of the present disclosure provide a message relay service. The message relay service provides an application programming interface (API) with which messages can be sent and received without handling specific implementation details of a messaging system. When inbound messages are received, the message relay service may provide a push notification and/or may store the message for later access. In examples, one or more source addresses are used to send messages. If the client device indicates a group of addresses should be used, one address is selected from the group and used to send a message accordingly. In some examples, the message relay service determines that a messaging gateway need not be used to message a recipient address, and transmits the message without use of the messaging gateway. The same API may be used to send and receive messages across different messaging systems without a customer handling system-specific complexities.

10 Claims, 9 Drawing Sheets

(56) References Cited

U.S. PATENT DOCUMENTS

2019/0230221 A1 7/2019 Archer
2021/0152500 A1 5/2021 Verbil

* cited by examiner

PLATFORM-AGNOSTIC MESSAGE RELAY SERVICE FOR INBOUND MESSAGES

BACKGROUND

Complexities of a messaging system may make it difficult for other software to integrate with the system. These and other high barriers to entry may increase the likelihood of security vulnerabilities and software defects, and may also cause computing resources to be underutilized or wasted. Finally, there may be increased software development costs and development delays as a result of such issues.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure provide a message relay service with which a client device and/or application is able to message recipient addresses associated with a messaging system without handling specific implementation details of the messaging system. The message relay service provides an application programming interface (API) that enables the client device/application to send and receive messages. When inbound messages are received, the message relay service may provide a push notification for the inbound message and/or may store the message in a data store for later access.

In examples, a customer is associated with a source address or a group of source addresses (such as phone numbers) from which to send messages. The group of source addresses is associated with a group identifier, such that, if the client uses the group identifier, one source address is selected from the group of source addresses and used to send a message accordingly. In some examples, the message relay service determines that a messaging gateway need not be used to message a recipient address, and transmits the message without use of the messaging gateway. The message relay service may interface with multiple messaging systems, such that the same API can be used to send messages to recipient addresses across different messaging systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
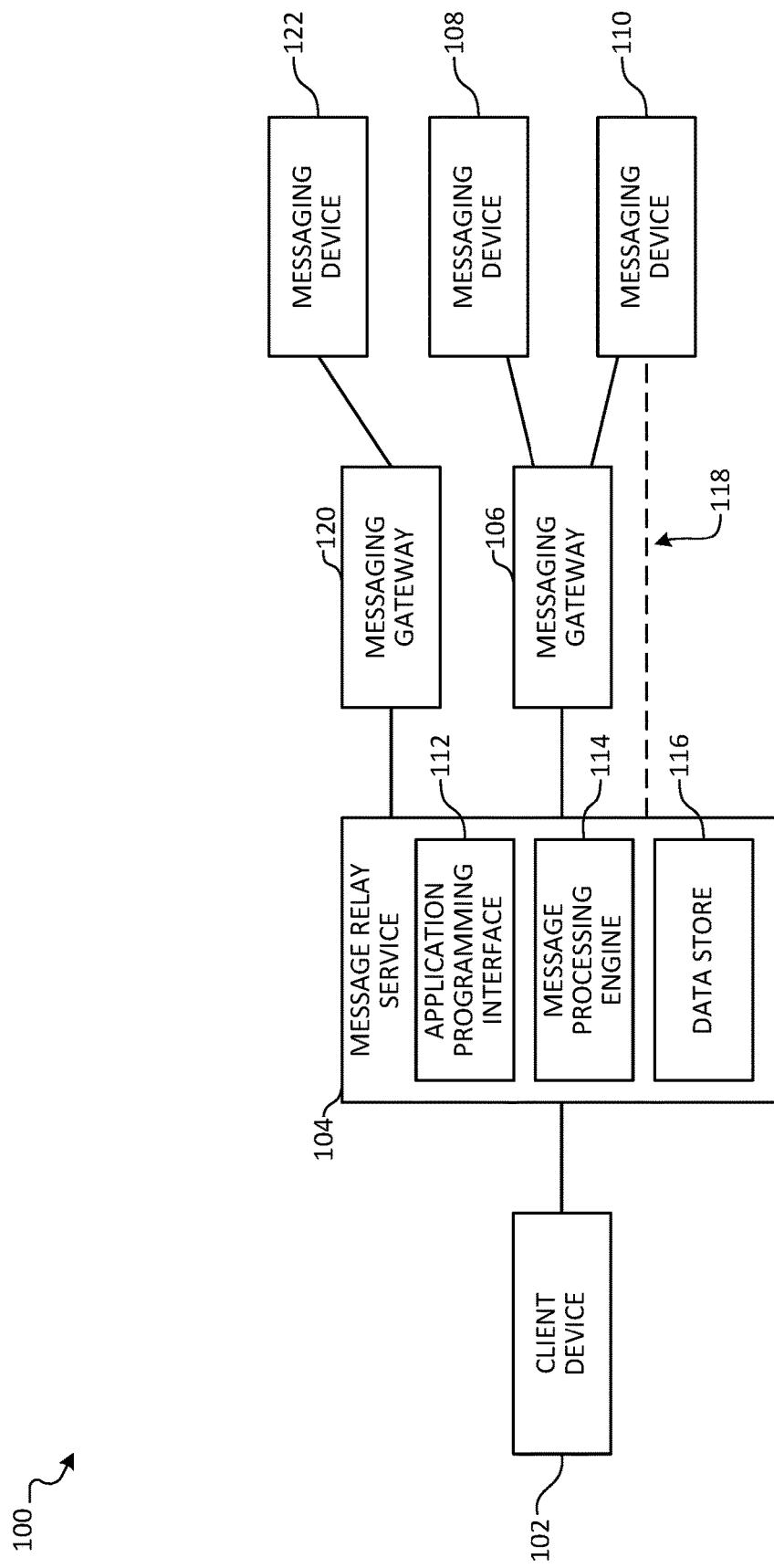
FIG. 1A illustrates an overview of an example system for a message relay service according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In order to use a messaging system to send and receive messages, a certain amount of technical understanding may be required to develop and maintain software that uses the messaging system accordingly. However, developing software that is properly integrated with the messaging system is difficult, especially in view of potential changes or updates to the messaging system, or when attempting to integrate the software with multiple messaging systems. As a result, it may be costly to develop software that is free from, or otherwise minimizes, security vulnerabilities and software defects. Further, the resulting software may use computing resources inefficiently.

Accordingly, aspects of the present disclosure relate to a message relay service that enables a client of a customer to transmit messages via a messaging system without integrating with the underlying messaging system. Further, the client may use the message relay service to communicate using a variety of messaging systems. Thus, the message relay service provides a layer of abstraction between technical-implementation details of one or more messaging systems and the ability of a customer and its associated clients to transmit messages using such systems.

In examples, the message relay service provides an application programming interface (API) that clients use to send and/or receive messages via one or more messaging systems. As used herein, a "client" is a client application executed by a client device unless otherwise specifically described. As an example, the API conforms to the representational state transfer (REST) architecture and uses hypertext transfer protocol (HTTP) requests to transmit commands and information. For example, the client communicates with the message relay service using HTTP requests (e.g., to send outbound messages, to update the configuration of the message relay service, etc.) Similarly, the client may implement a REST service, such that the message relay service is able to communicate with the client (e.g., to provide a push notification regarding an inbound message or a read receipt or other status indication for an outbound message, etc.). While an example API is described herein as implementing REST and HTTP, it will be appreciated that alternative APIs may be implemented using any of a variety of other technologies.

Example messaging systems include, but are not limited to, a short message service (SMS), a multimedia message service (MMS), rich communication services (RCS), FACEBOOK MESSENGER, WHATSAPP, and WECHAT. A message comprises a source address, a recipient address, and a message body. In some examples, the message further comprises a subject and/or an attachment, among other fields. As used herein, a source or recipient address may be a telephone number (e.g., a short code, a long code, a toll-free number, etc.), a username, or an email address, among other examples. Thus, a request to send an outbound message comprises a source address and a recipient address, indicating that the message is to be sent from the source address to the recipient address. In some examples, rather than specifying a source address, a group identifier is used in the request to send an outbound message. The group identifier is associated with a set of source addresses, such that one source address is selected from the set at random and is then used as the source address from which the message is sent to the recipient address. It will be appreciated that other techniques may be used to select the source address from the set. In some instances, the selected source address is associated with the recipient address in a data store, such that the same source address is used to communicate with the recipient address in the future. As another example, an indication as to which address of the set of addresses was used to message the recipient address may be generated and provided from the message relay service to the client (e.g., as part of a response to the request to transmit the outbound message, as a separate indication, or otherwise).

A customer record may be stored for each customer of the message relay service. In examples, the customer record comprises authentication information (e.g., a username, a password, an OAuth token, etc.), billing information (e.g., a billing address, a bank account or credit card, etc.), configuration information (e.g., one or more source addresses from which to send messages, whether to send push notifications on inbound messages, a uniform resource locator (URL) at which to direct push notifications, whether to store messages in a data store, etc.), and/or permissions information (e.g., whether the customer is authorized for international messaging, a maximum rate at which the customer can send or receive messages, etc.).

FIG. 1A illustrates an overview of an example system 100 for a message relay service according to aspects described herein. As illustrated, system 100 comprises client device 102, message relay service 104, messaging gateways 106 and 120, and messaging devices 108, 110, and 122. In examples, elements 102-110 and 120-122 communicate using one or more networks, including, but not limited to, a local area network, a wide area network, and/or the Internet. Client device 102 is associated with a customer of message relay service 104 and may be any of a variety of computing devices, including, but not limited to, a mobile computing device, a tablet computing device, a laptop computing device, or a desktop computing device. Similarly, messaging devices 108, 110, and 122 may be any of a variety of computing devices.

Messaging gateway 106 transmits messages to and from messaging devices 108 and 110 via a messaging system, each of which is associated with one or more recipient addresses. Similarly, messaging gateway 120 transmits messages to and from messaging device 122 according to a recipient address associated with messaging device 122. In examples, messaging devices 108 and 110 each have an associated telephone number and messaging gateway 106 is an SMS hub provider (e.g., Syniverse®, SAP®, etc.), such that SMS messages are transmitted to and from messaging devices 108 and 110 via messaging gateway 106. As an example, messaging gateway 106 and/or messaging gateway 120 provide an API to send and receive messages via its respective messaging system. As another example, messaging gateway 106 and/or messaging gateway 120 may operate according to a specification or protocol that defines how to send and receive messages via its messaging system. Thus, messaging gateways 106 and 120 each represent different messaging systems and may operate according to the same, similar, or different APIs, protocols, and/or specifications.

As illustrated, message relay service 104 enables client device 102 to transmit messages via messaging gateways 106 and 120 to messaging devices 108, 110, and/or 122 without specifically implementing an API or specification of messaging gateways 106 and 120. Rather, client device 102 communicates with application programming interface 112 of message relay service 104, which may conform to the REST architecture and use HTTP requests as described above, among other examples. Client device 102 may comprise a REST service. Accordingly, application programming interface 112 receives requests from and sends requests to client device 102, thereby enabling client device 102 to send and receive messages, respectively, via messaging gateway 106 and/or messaging gateway 120. Application programming interface 112 communicates with message processing engine 114 to transmit messages. Accordingly, message processing engine 114 may determine which messaging gateway 106 or 120 is responsible for a given recipient address and uses the determined messaging gateway accordingly. In some examples, a different source address may be associated with each messaging gateway, such that the source address is dynamically selected according to which messaging gateway is used. In other examples, a single source address may be used to transmit messages in a variety of different messaging systems. Further, each message may be of a different type. For example, a single toll-free number source address may be used to transmit SMS messages, voice messages, and email messages via their respective messaging systems, among other examples. It will be appreciated that while examples are discussed below with respect to messaging gateway 106 and its associated messaging devices 108 and 110, similar techniques are applicable to messaging gateway 120 and messaging device 122.

In examples, message processing engine 114 verifies that inbound and outbound messages are associated with a customer, generates a request to messaging gateway 106 based on a received request to transmit a message from a source address to a recipient address (e.g., as may be received from client device 102 via application programming interface 112), and processes an inbound message (e.g., as may be received via messaging gateway 106 from a source address to a recipient address associated with a customer of message relay service 104).

As an example, message processing engine 114 processes the inbound message to verify that the inbound message is associated with a customer of message relay service 104 (e.g., based on determining that the recipient address is associated with the customer). Message processing engine 114 further determines whether the message should be stored in data store 116 and/or used to generate a push notification that is provided to client device 102. The determination may comprise evaluating a customer record, which may be stored by data store 116. If it is determined that a push notification should be generated for the inbound message, the push notification is generated based on the inbound message and comprises at least the source address and a part of the message body. A callback URL for a REST service of client device 102 is determined, which is then used to deliver the push notification to client device 102 accordingly. Access to messages in data store 116 may be provided via a website or a client application, among other examples.

As another example, message processing engine 114 processes a request to transmit an outbound message to a recipient address (e.g., as may be received from client device 102 via application programming interface 112). In some examples, the request is verified to determine that the request is from a customer of message relay service 104 and that it conforms to permission associated with the customer. For example, the verification may comprise determining whether the customer is permitted to message a domestic or international recipient address, or whether the customer has exceeded their maximum transmission rate, among other examples. The request may comprise a source address and/or a group identifier. In examples where the request comprises a group identifier, a set of addresses associated with the customer is identified (e.g., as may be stored in a customer record by data store 116) and used to select a source address from which to send the message, as described above. The selected source address may be communicated back to the client device (e.g., as part of a message delivery status indication, as a separate indication, etc.).

In some examples, message processing engine 114 determines whether the recipient address is an address to which message relay service 104 is able to deliver directly (e.g., without messaging gateway 106). As an example, this may be the case if message relay service 104 is associated with a carrier that is responsible for a telephone number specified by the recipient address. Dashed line 118 is shown between message relay service 104 and messaging device 110 to illustrate such aspects. Alternatively, message processing engine 114 generates a request to transmit the message from the source address to the recipient address, which is transmitted to messaging gateway 106. In examples, message processing engine 114 authenticates with messaging gateway 106 using OAuth. Messaging gateway 106 then transmits the outbound message to the recipient address (e.g., messaging device 108 or messaging device 110).

Message processing engine 114 may generate an outbound message delivery status indication, which is transmitted to client device 102 in response to the request to transmit an outbound message. As an example, messaging gateway 106 may provide an indication as to whether the message was delivered, which may be received by message processing engine 114 and used to generate the outbound message delivery status indication accordingly. In examples, the delivery status indication comprises a source address from which the message was sent, as may be the case when a group identifier is provided in the initial request to transmit the message. The indication may be provided to a callback URL, which is the same or similar to the callback URL discussed above with respect to the inbound message indication. For example, the callback URL may be associated with a REST service of client device 102. In other examples, such information discussed above with respect to the outbound message delivery status indication may be stored additionally or alternatively in data store 116, for later access by client device 102 and/or for generating reports.

While the above examples are discussed in the context of receiving a transmission request for sending a message to a single recipient, it will be appreciated that similar techniques may be used to send a message to a list of recipient addresses. In examples, message processing engine 114 iterates through the list, where a request is generated and sent to messaging gateway 106 for each recipient address (or, in another example, is delivered without use of messaging gateway 106, as illustrated by dashed line 118). In other examples, at least a subset of the recipient addresses is provided to messaging gateway 106 (e.g., based on determining messaging gateway 106 is associated with the subset of recipient addresses), thereby causing messaging gateway 106 to transmit the message to each address of the subset of recipient addresses, rather than requiring that message processing engine 114 iterates through each individual recipient address. An outbound message delivery status indication may be generated for each recipient address of the set, for multiple subsets of addresses, or there may be one indication for the entire set of addresses.

In an example, caching is used, which may improve the performance of message relay service 104. For example, message relay service 104 may comprise a caching engine that caches information accessed from data store 116 (e.g., at least a part of one or more customer records, a callback URL to use for transmitting a push notification, etc.). As another example, a caching server device may exist between message relay service 104 and messaging gateway 106. HTTP REST API requests and associated responses may be cached (e.g., according to caching techniques for HTTP traffic) in order to reduce computing resource utilization for repeated requests. An example instance in which caching may improve performance is when sending message to a (potentially large) set of recipient addresses.

Message relay service 104 may charge a customer for transmitting inbound and/or outbound messages according to any of a variety of techniques. For example, a surcharge may be used, where a wholesale cost for a message is determined and incremented according to the surcharge. In examples, the surcharge may vary depending on the customer and/or the volume of message traffic, among other considerations. As another example, different rates may be used for different geographic regions, types of messages (e.g., as may be transmitted via different messaging gateways or without use of a messaging gateway), and/or whether a message is an inbound message or an outbound message. A customer record may further store billing information for the customer, such as one or more negotiated rates, a billing credit, a billing period, and/or a payment method, among other examples. Usage information for a customer may be stored in data store 116, which may be processed in combination with the billing information for the customer in order to generate a bill accordingly (e.g., periodically, at the direction of the customer, etc.). It will be appreciated that alternative billing techniques may be used without departing from the aspects described herein.

It will be appreciated that while system 100 is described with respect to one client device 102, one messaging gateway 106, and two messaging devices 108 and 110, any number of such elements may be used in other examples. As an example, a customer may have multiple client devices that communicate with message relay service 104. In another example, a customer uses the same client device to send and receive messages associated with different customer records. In such an example, the customer may have different brands and may therefore separately manage sending and/or receiving messages associated with different source addresses and potentially different target audiences. As another example, multiple customers may each use a set of respective client devices to communicate with message relay service 104. In some instances, multiple messaging gateways may be used to transmit messages using different services.

Figure 1B:
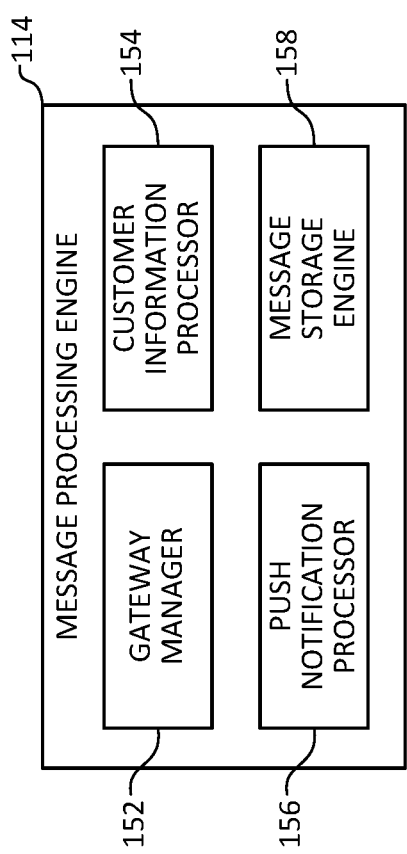
FIG. 1B illustrates an overview of an example message processing engine in a message relay service.

FIG. 1B illustrates an overview of an example message processing engine 114 for use in a message relay service. As illustrated, message processing engine 114 comprises gateway manager 152, customer information processor 154, push notification processor 156, and message storage engine 158. In examples, elements 152-158 are used to perform the example aspects described above with respect to message processing engine 114 in FIG. 1A.

Gateway manager 152 communicates with one or more messaging gateways (e.g., messaging gateway 106 in FIG. 1A) to send and receive messages (e.g., as may be directed by client device 102 via application programming interface 112). As discussed above, each messaging gateway may provide an API to send and receive messages via its messaging system and/or may implement a specification or protocol that defines how to send and receive messages via its messaging system. Accordingly, gateway manager 152 implements such APIs, specifications, and or protocols to integrate with the message gateway. As an example, gateway manager 152 uses a REST API provided by the messaging gateway and further comprises a REST service that is used by the messaging gateway to communicate information to message processing engine 114. In examples, such requests and associated responses may be cached using a caching engine or caching server device according to aspects described herein, thereby improving performance of the same or similar repeated requests. As noted above, a variety of other communication techniques may be used instead of or in addition to REST and/or HTTP. For example, the session initiation protocol (SIP) may be used by gateway manager 152 to communicate with messaging gateway 106 and/or 120. In some examples, one technique may be used to communicate to a messaging gateway, while another technique may be used to receive communications from the messaging gateway.

Message processing engine 114 uses gateway manager 152 to process messages associated with addresses for which a particular messaging gateway is determined to be responsible. In instances where delivery is possible without the messaging gateway, message processing engine 114 may send or receive the message without gateway manager 152 and the associated messaging gateway. It will be appreciated that, in examples where multiple messaging gateways are used, multiple gateway managers may be used (where each gateway manager implements gateway-specific functionality in order to communicate with its respective messaging gateway).

Customer information processor 154 generates, updates, and/or otherwise evaluates customer records (e.g., as may be stored by data store 116 in FIG. 1A). For example, customer information processor 154 determines whether a client is associated with a customer of the message relay service when a request (e.g., to transmit a message, to access stored messages, etc.) is received from the client (e.g., based on validating authentication credentials, an OAuth token, etc.) and whether an inbound message is associated with a customer (e.g., based on matching a recipient address to an address associated with a customer). In another example, customer information processor 154 verifies whether the customer has permission to message addresses associated with a certain region (e.g., national, international, on a state-by-state or country-by-country basis, etc.). Customer information processor 154 may evaluate a customer record determine whether an inbound message should be stored (e.g., by message storage engine 158) and/or used to generate a push notification (e.g., by push notification processor 156), and may further determine a callback URL to use when generating the push notification.

Message processing engine 114 is further illustrated as comprising push notification processor 156, which generates a push notification of an inbound message to a recipient address of a customer and/or an outbound message delivery status indication to a client device as described above, among other examples. As an example, push notification processor 156 determines a callback URL at which to provide the push notification, which may be associated with a REST service of a client device (e.g., client device 102 in FIG. 1A). Push notification processor 156 may receive an indication of an inbound message (e.g., as may be received from a messaging gateway by gateway manager 152), which is used to generate a push notification of the inbound message as described above. For example, the push notification may comprise a source address, a recipient address, a message body, a subject, an attachment, and/or a timestamp, among other examples. In another example, push notification processor receives a delivery status indication (e.g., from a messaging gateway via gateway manager 152 after gateway manager 152 generates a request for the messaging gateway to transmit a message to a recipient address) and uses the delivery status indication to generate a push notification as to the delivery status of the outbound message.

Message storage engine 158 stores messages that are processed by message processing engine 114, according to aspects described herein. For example, if customer information processor 154 determines to store an inbound message, message storage engine 158 stores the inbound message in a data store, such as data store 116 in FIG. 1A. In another example, message storage engine 158 stores information associated with outbound message delivery status indication, among other information that may be used for generating reports (e.g., inbound/outbound message statistics, success/failure rates, frequency information associated for each address associated with a group identifier, etc. Access to stored messages may be provided to the customer via a website or a client application, among other examples.

While example operations are described above with respect to message processing engine 114 and its constituent elements 152-158 as illustrated in FIGS. 1A-1B, it will be appreciated that, in other examples, the described functionality may be distributed among fewer, alternative, or additional elements.

Figure 2:
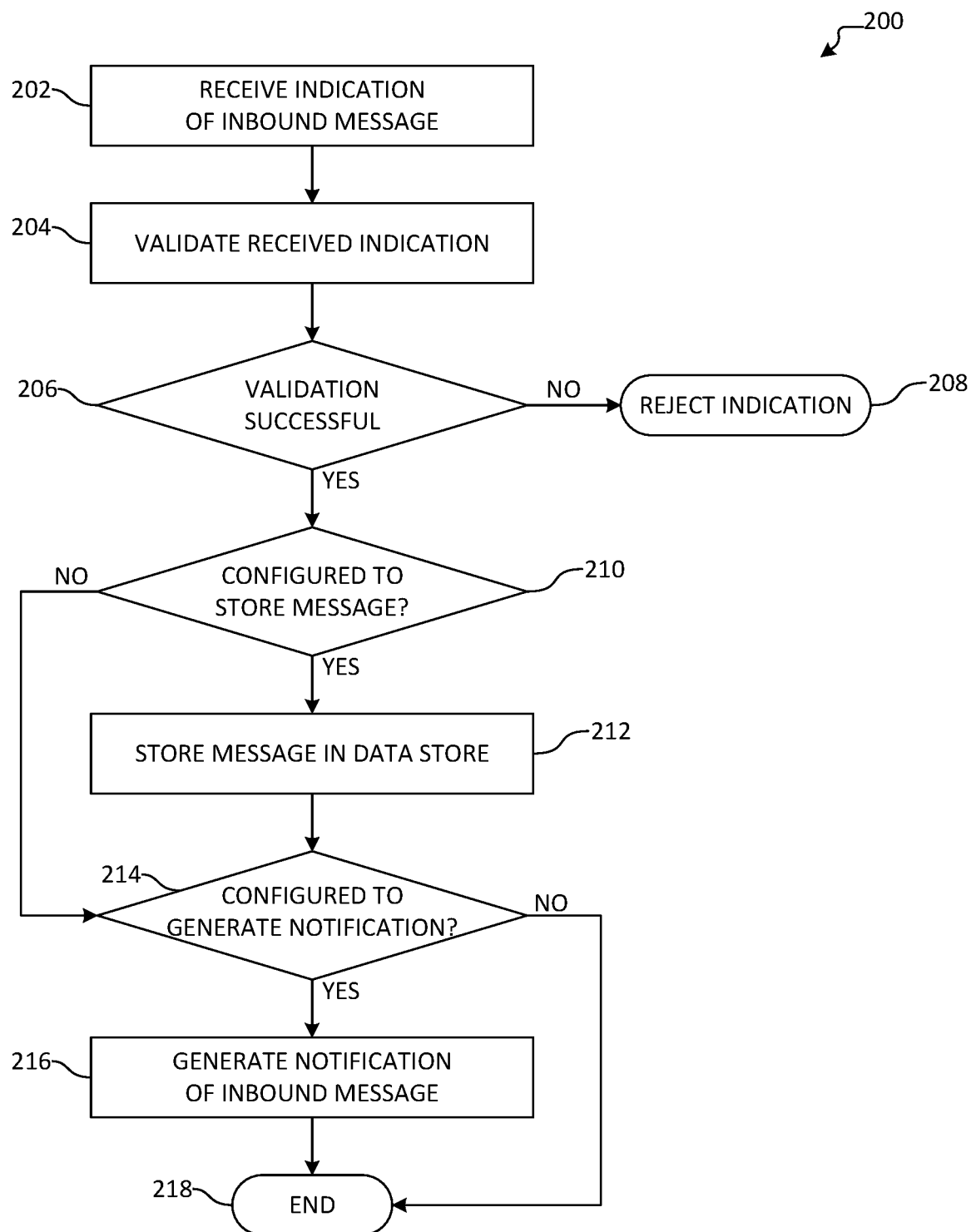
FIG. 2 illustrates an overview of an example method for processing an inbound message by a message relay service.

FIG. 2 illustrates an overview of an example method 200 for processing an inbound message by a message relay service (e.g., from a messaging device 108, 110, or 122, such as message relay service 104 discussed above with respect to FIGS. 1A-1B). Method 200 begins at operation 202, where an indication of an inbound message is received. In examples, the indication comprises a source address, a recipient address, and a message body. The indication may be received from a messaging gateway (e.g., messaging gateway 106 or messaging gateway 120 in FIG. 1A). In examples, the indication may be received via a gateway manager, such as gateway manager 152 in FIG. 1B. As another example, the indication is received without the use of a messaging gateway (e.g., as may be received via a carrier associated with the message relay service and/or messaging service).

Flow progresses to operation 204, where the received indication is validated. In an example, validation comprises determining whether the recipient address is associated with a customer, as may be determined based on a customer record. Such aspects may be performed by a customer information processor, such as customer information processor 154 in FIG. 1B, accessing a data store such as data store 116 in FIG. 1A. It will be appreciated that other operations may be performed as part of operation 204, including, but not limited to, validating the source address is associated with a geographic location for which the customer is permitted to receive messages or that the customer is configured to store inbound messages and/or receive push notifications for inbound messages. As another example, validation comprises evaluating the inbound message to determine whether it should be blocked (e.g., because it is a spam or a phishing message, etc.). Such an evaluation may be performed based at least in part on a block list and/or allow list of addresses, according to pattern matching, or using machine learning techniques, among other examples.

At determination 206, it is determined whether the validation performed at operation 204 was successful. If validation was not successful, flow branches "NO" to operation 208, where the indication and its associated inbound message are rejected and flow terminates. However, if validation is successful, flow instead branches "YES" to operation 210, where it is determined whether the customer configured the message relay service to store the inbound message. In examples, aspects of the determination are performed by a customer information processor, such as customer information processor 154 accessing data store 116 in FIGS. 1B and 1A, respectively.

If it is determined to store the message, flow branches "YES" to operation 212, where the message is stored in a data store (e.g., data store 116 in FIG. 1A). In examples, aspects of operation 212 are performed by a message storage engine, such as message storage engine 158 described above with respect to FIG. 1B. In some examples, the stored message comprises the source address, the recipient address, and the message body. The stored message may also comprise an attachment, a timestamp at which the message was received, and/or a geographic location associated with the message. In some examples, the message body is not stored, and only a subset of the above-described information is stored, as may be the case if the customer record indicates that messages are to be stored for logging and/or reporting purposes. Flow then progresses to operation 214, which is discussed below.

If, however, it is determined that the message should not be stored, flow instead branches "NO" to operation 214, where it is determined whether the customer configured the message relay service to generate a push notification. In examples, aspects of the determination are performed by a customer information processor, such as customer information processor 154 accessing data store 116 in FIGS. 1B and 1A, respectively. If it is determined that a push notification should not be generated, flow branches "NO" to operation 218, where method 200 ends.

However, if it is determined to generate a push notification, flow branches "YES" to operation 216, where a notification is generated based on the inbound message. In examples, aspects of operation 216 are performed by a push notification processor, such as push notification processor 156 in FIG. 1B. As an example, a callback URL at which to provide the push notification is determined. The callback URL may be determined by a customer information processor, such as customer information processor 154 in FIG. 1B. The callback URL may be associated with a REST service provided by a client (e.g., client device 102 in FIG. 1A). Accordingly, a push notification is generated and transmitted to the client using the callback URL. For example, the push notification may comprise a source address, a recipient address, a message body, a subject, an attachment, and/or a timestamp, among other examples. While examples herein are described with respect to an HTTP request to a callback URL according to the REST architecture, it will be appreciated that other techniques may be used to provide a push notification of the received inbound message. Flow ends at operation 218.

Figure 3:
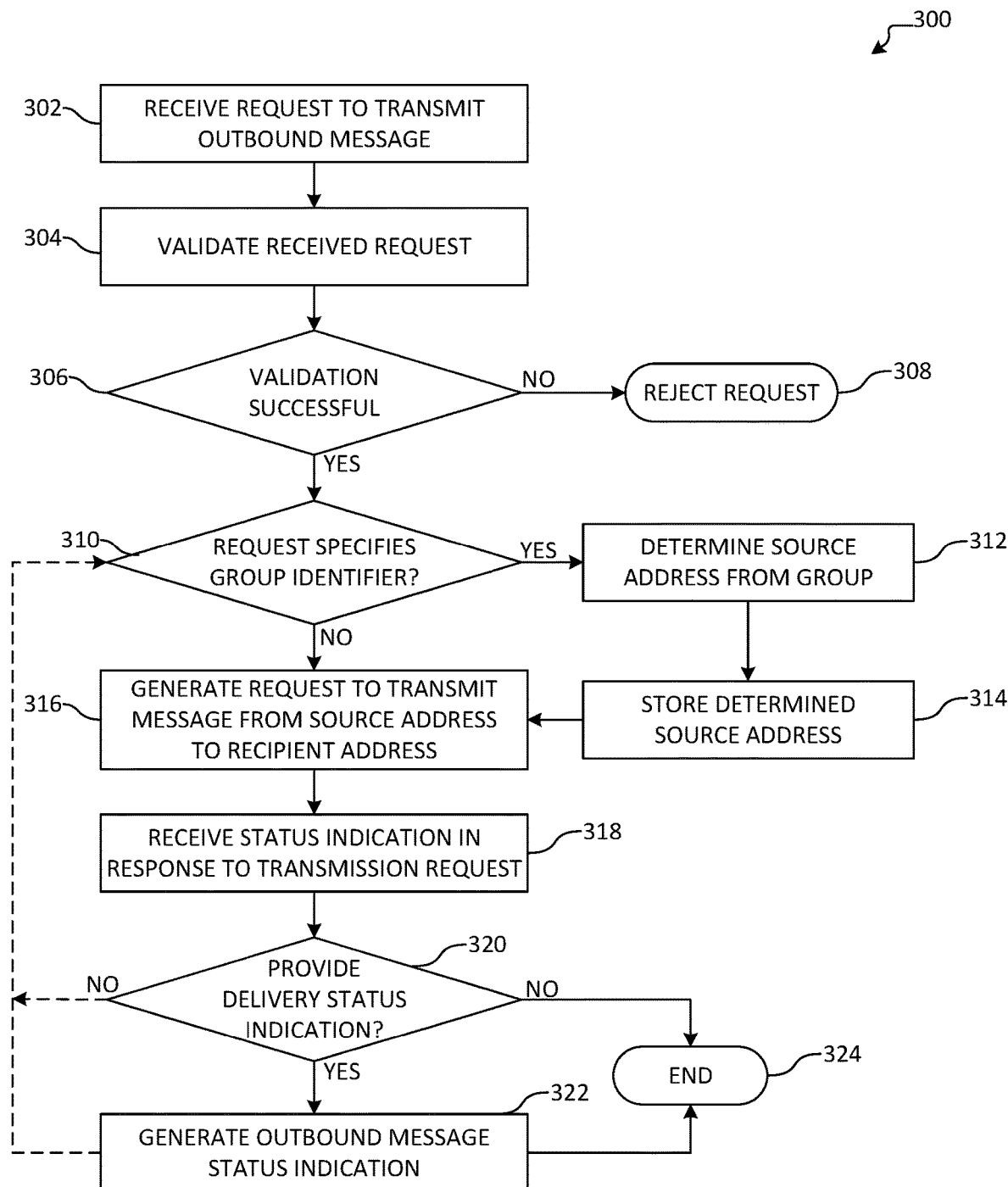
FIG. 3 illustrates an overview of an example method for processing an outbound message by a message relay service.

FIG. 3 illustrates an overview of an example method 300 for processing an outbound message by a message relay service. In examples, aspects of method 300 are performed by a message relay service, such as message relay service 104 discussed above with respect to FIGS. 1A-1B. Method 300 begins at operation 302, where a request to transmit an outbound message is received. In examples, the request is received via an API, such as application programming interface 112 in FIG. 1A. The request may comprise a source address or group identifier from which the message should be sent, as well as a recipient address. In examples, the request further comprises a message body, a subject, and/or an attachment, among other information.

At operation 304, the request is validated. In an example, validation comprises determining whether the request was received from a customer (e.g., by validating authentication information, such as a username and password, an OAuth token, etc.), whether the source address or group identifier is associated with the customer, and/or whether the recipient address is associated with a geographic region to which the customer is permitted to send messages. Such aspects may be verified by a customer information processor, such as customer information processor 154 in FIG. 1B, accessing a data store such as data store 116 in FIG. 1A. As another example, validation comprises evaluating the request to determine whether it should be blocked (e.g., because it is a spam or a phishing message, etc.). Such an evaluation may be performed based at least in part on a block list and/or allow list of addresses, according to pattern matching, or using machine learning techniques, among other examples.

At determination 306, it is determined whether the validation performed at operation 304 was successful. If validation was not successful, flow branches "NO" to operation 308, where the request is rejected and flow terminates. However, if validation is successful, flow instead branches "YES" to determination 310, where it is determined whether the request specifies a group identifier (e.g., rather than a source address from which to send the message). As discussed above, a group identifier is associated with a set of addresses, such that one address of the set of addresses may be determined and used to send the message. Thus, if it is determined that the request specifies a group identifier instead of a source address, flow branches "YES" to operation 312, where a source address is determined based on the group identifier. In examples, the determination comprises accessing a set of addresses associated with the identifier, as may be performed by a customer information processor, such as customer information processor 154 in FIG. 1B. The source address may be determined randomly or programmatically. For example, the source address may be selected from the set of source addresses based on an association with a geographic region that is the same or similar as a geographic region of the recipient address. As another example, frequency information indicating the frequency at which each address has been used in the past may be used in order to more evenly distribute messages across the set of addresses. In a further example, a customer record (e.g., in a data store such as data store 116 in FIG. 1A) is evaluated to determine whether there is a pre-existing association between the recipient address and a source address in the set of addresses associated with the identifier. It will be appreciated that other techniques may be used to determine the source address without departing from the spirit of this disclosure.

At operation 314, the determined source address is stored. In examples, storing the source address comprises associating the source address with the recipient address, such that the same source address may be used to transmit messages to the recipient address in the future. The association may be part of a customer record stored by a data store such as data store 116 in FIG. 1A. Flow then progresses to operation 316, which is discussed below.

Returning to determination 310, if it is determined that the request does not comprise a group identifier (and instead comprises a source address), flow instead branches "NO" to operation 316. At operation 316, a request is generated to transmit a message from a source address to a recipient address. In examples, the request is generated by a gateway manager and provided to a messaging gateway, such as gateway manager 152 and messaging gateways 106 and 120 in FIGS. 1B and 1A, respectively. In other examples, operation 316 further comprises a determination that the recipient address is an address for which the message may be transmitted without a messaging gateway, as may be the case when the message relay service is associated with a carrier. Accordingly, the request to transmit the message may remain within the carrier's network. Operation 316 may comprise a determination that the recipient address supports receiving messages, for example by querying a remote computing device such as may be provide by NETNUMBER.

In some examples, operation 316 comprises a determination that the request received at operation 302 comprises an attachment (e.g., an image, a video, etc.) or that the message body comprises content that cannot be transmitted to the recipient address. For example, it may be determined that the message comprises an image that cannot be transmitted as an SMS. As a result, the attachment and/or other content may be stored in a data store (e.g., data store 116 in FIG. 1A) and a URL to access the data in the data store may be included in the message body, thereby enabling the recipient to access the attachment/content even though the messaging service does not support such content. As another example, the message may comprise a link to a website implementing web real-time communication (WebRTC), thereby enabling a recipient to communicate via the website. In a further example, it may be determined that the message body is longer than a supported message length of the messaging system. Accordingly, the message body is split into multiple messages. In some examples, splitting the message body comprises an evaluation of one or more words, sentences, URLs, or other content therein to ensure that the one or more boundaries on which the message body is split do not segment the message in a way the impacts readability or, in the case of URLs some other content, functionality. Such a determination may comprise an evaluation of the messaging gateway and/or messaging system responsible for the recipient address, as different gateways and systems may have different supported message lengths.

At operation 318, a status indication is received in response to the transmission request. For example, the status indication may be received by a gateway manager, such as gateway manager 152 in FIG. 1B. The indication may be part of a response to an HTTP request (e.g., if the request generated at operation 316 was an HTTP REST request to a REST service provided by a messaging gateway). In another example, the indication may be a separate communication from the messaging gateway or other computing device. As discussed above, the received status indication indicates whether the message was delivered (e.g., success, failure, waiting to retry, etc.). It will be appreciated that the status indication may comprise other information, including, but not limited to, a retry interval, an amount of time used to process the request, etc.

Flow progresses to determination 320, where it is determined whether a delivery status indication should be provided. In examples, aspects of the determination are performed by a customer information processor, such as customer information processor 154 accessing a customer record of data store 116 in FIGS. 1B and 1A, respectively. If it is determined that a delivery status indication should not be provided, flow branches "NO" to operation 324, where method 300 ends.

If, however, it is determined that a delivery status indication is to be provided, flow branches "YES" to operation 322, where an outbound message status indication is generated. In examples, the outbound message status indication is generated by a push notification processor, such as push notification processor 156 in FIG. 1B. As an example, a callback URL at which to provide the message status indication is determined. The callback URL may be determined by a customer information processor, such as customer information processor 154 in FIG. 1B. The callback URL may be associated with a REST service provided by a client device (e.g., client device 102 in FIG. 1A). Accordingly, an outbound status message indication is generated using the callback URL. For example, the status indication may comprise at least a part of the information that was received at operation 318, such as an indication as to whether the message was delivered, a retry interval, and/or an amount of time used to process the request. The status indication may also comprise a source address from which the message was sent (e.g., as may be the case if the request specified a group identifier instead of a source address) and/or a recipient address, among other examples. While examples described herein are described with respect to an HTTP request to a callback URL according to the REST architecture, it will be appreciated that other techniques may be used to provide a push notification of the received inbound message. Flow then ends at operation 324.

Method 300 is further illustrated as comprising dashed arrows from determination 320 and operation 322 to determination 310, thereby indicating that, in other examples, operations 310-322 are performed multiple times in a loop. For example, the received request may specify a set of recipient addresses, such that each recipient address is iteratively messaged according to the aspects discussed above. For example, the source address determination at operation 312 may be performed for each recipient address specified by the received request. In another example, the determined source address may be used for each recipient address of the set of recipient addresses. In a further example, one or more sets of recipient addresses are batched in the request to the messaging gateway at operation 316, thereby causing the messaging gateway to transmit the message to each recipient address in the set according to aspects described herein. Further, it will be appreciated that, in other examples, an outbound message status indication need not be generated separately for each recipient address. Rather, such an indication may be generated for a set of recipient addresses, or may be generated once each address of the set of recipient addresses has been messaged. Flow eventually terminates at operation 324.

Figure 4:
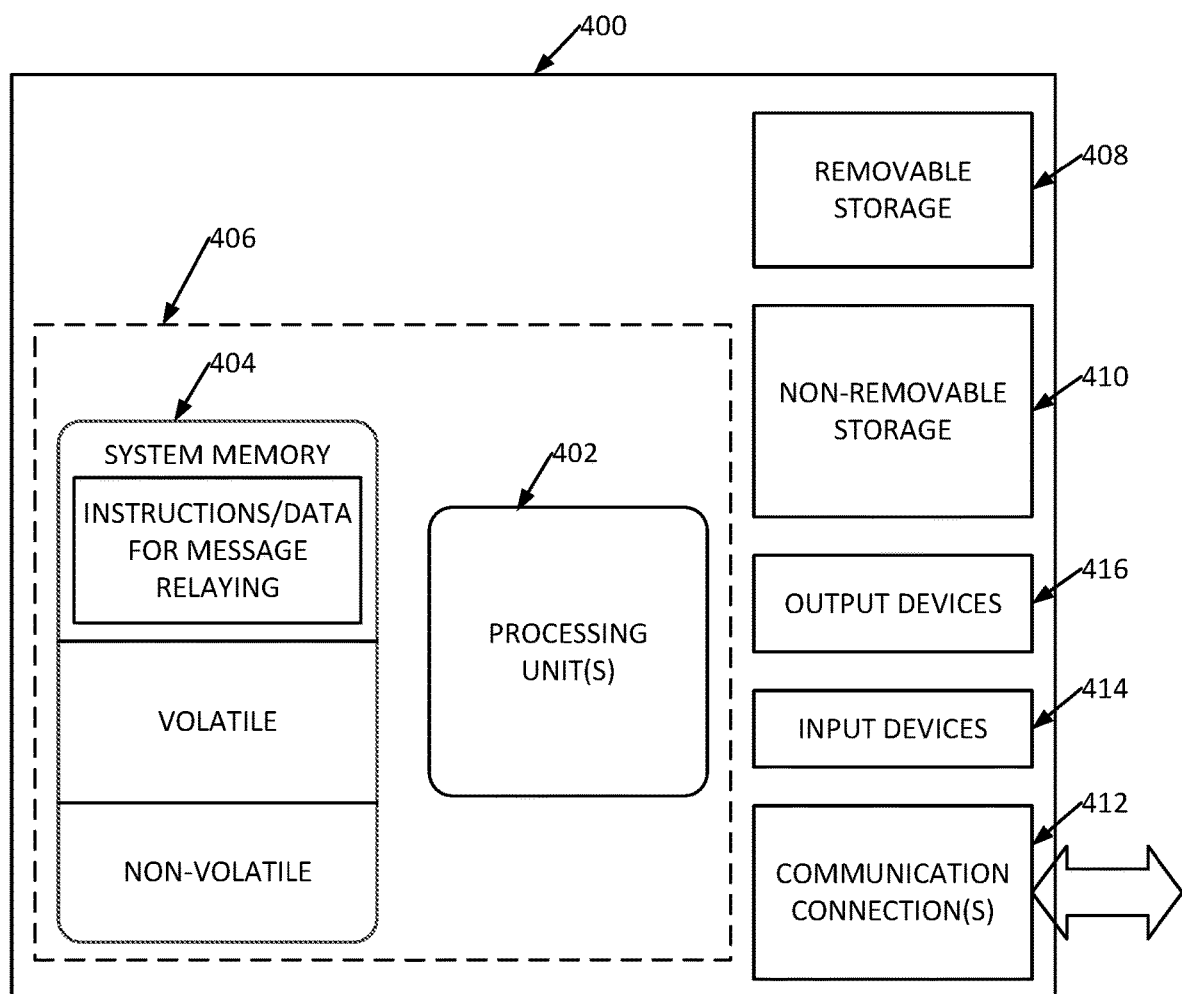
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like. The operating environment 400 may be used to implement one or more of the services, devices, clients, servers, or other embodiments described in this application.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIGS. 2 and 3, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Figure 5A:
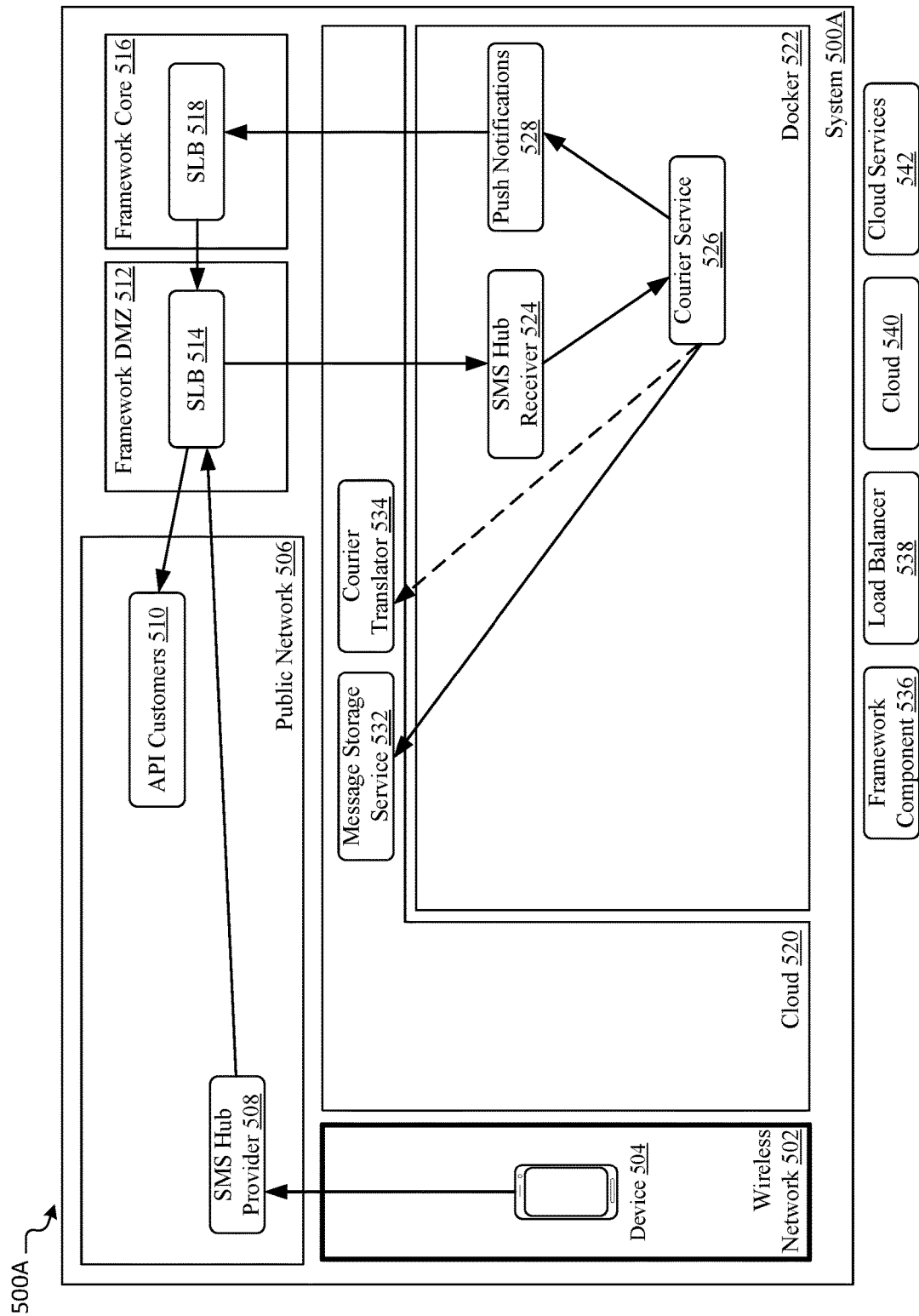
FIG. 5A illustrates an overview of another example system for a message relay service processing an inbound message according to aspects described herein.

FIGS. 5A, 5B, 6A, and 6B are provided as additional examples of aspects described herein. Turning first to FIG. 5A, a system 500A is shown in which an inbound message is received at device 504 on a wireless network 502. The inbound message passes through an SMS hub provider 508, which is an example messaging gateway on a public network 506 (e.g., Syniverse®, SAP®, etc.). Flow progresses to a server load balancer 514 (SLB 514) in a framework de-militarized zone 512 (framework DMZ 512). The SLB 514 acts as a gateway or internet protocol (IP) traffic server load balancer between a private network (e.g., a cloud 520) and a public network (e.g., the public network 506). An example of an SLB 514 is Zeus Traffic Manager by Zeus™ or vTM by Pulse Secure®. The framework DMZ 512 is a subnetwork with firewalls on both sides to an internal network from being hacked. The framework DMZ 512 may be in a service delivery framework (SDF), which may also be referred to as an application framework (AF).

An indication is then provided to an SMS hub receiver 524 and a message relay service 526 (otherwise referred to as courier service 526). The courier service 526 is a non-exclusive example of messaging gateway 106/120 and message relay service 104, respectively, in FIG. 1A. The SMS hub receiver 524, the courier service 526, and push notifications 528 may be deployed in a virtualized container, which is referred to herein as a Docker 522. If it is determined that the message is stored, the path from the courier service 526 to the message storage service 532 is followed (e.g., data store 116 and message storage engine 158 in FIGS. 1A and 1B, respectively). If a push notification 528 is to be generated, the path from the courier service 526 to the push notifications 528 is followed, which notification is then pushed through SLB 518 in framework core 516 and SLB 514 in framework DMZ 512, and is ultimately delivered to API customers 510. Such aspects may correspond at least in part to using push notification processor 156 in FIG. 1B to provide an indication of an inbound message to a client device 102 in FIG. 1A. The dashed arrow between the courier service 526 and the courier translator service 534 indicates an analysis of customer records (e.g., as may be stored by data store 116 in FIG. 1A and analyzed by customer information processor 154 in FIG. 1B). Such aspects may be similar to method 200 of FIG. 2. The system 500A may also include a framework component 536 for an SDF, a load balancer 538, a cloud 540 including computing infrastructure for the courier service 526, and cloud services 542.

Figure 5B:
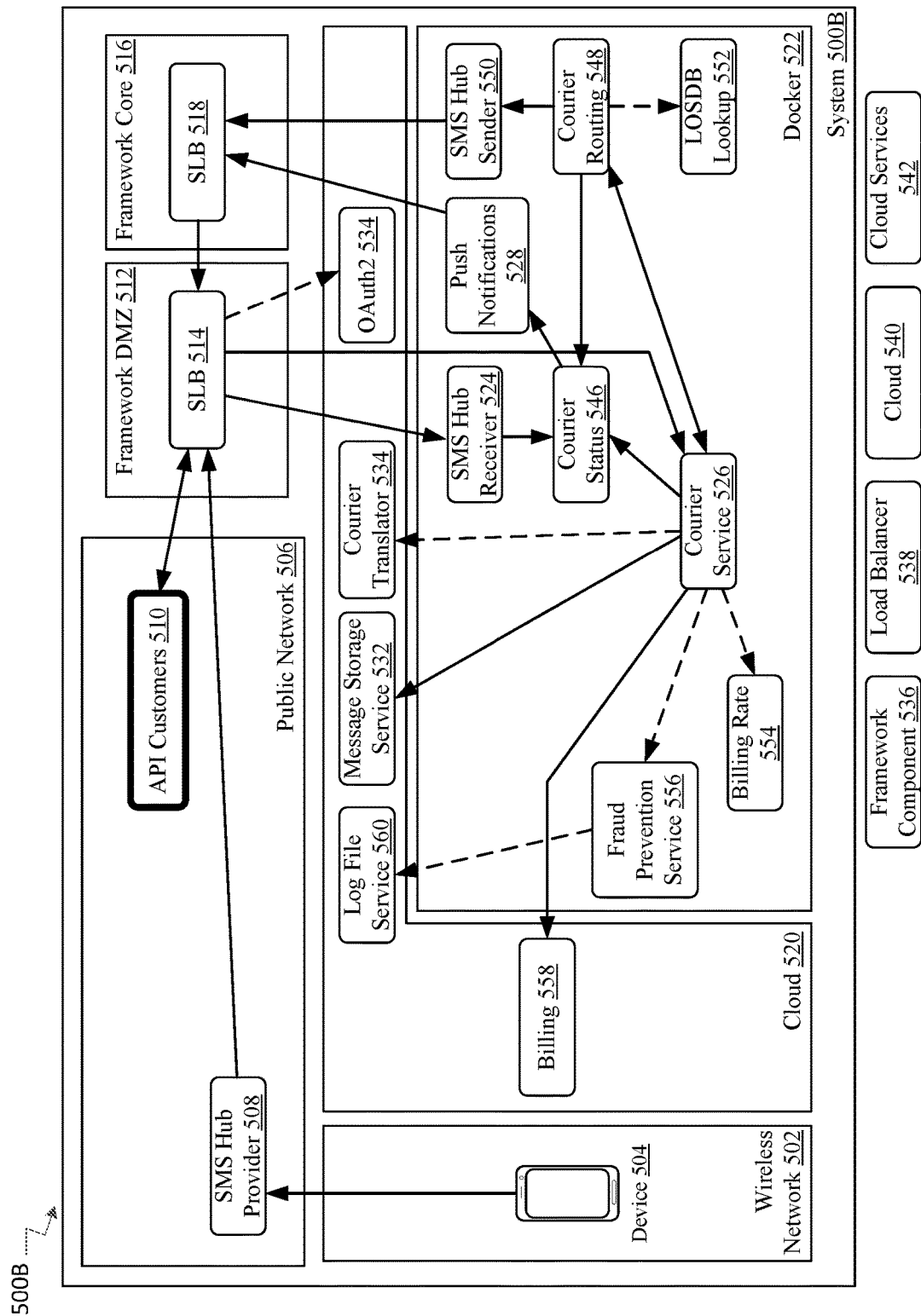
FIG. 5B illustrates an overview of another example system for a message relay service processing an outbound message according to aspects described herein.

FIG. 5B illustrates an example system 500B for processing an outbound message, as may be received from API customers 510. Certain elements of FIG. 5B are similar to FIG. 5A and are therefore not described again in detail below. OAuth2 service 534 may be used to verify (e.g., authenticate and/or authorize) the request to send the outbound message, after which it is provided to the courier service 526. A courier translator service 534 (e.g., a service providing subscriber configuration information) may be queried to validate the message (e.g., similar to operation 304 described above with respect to method 300 in FIG. 3). Fraud prevention service 556 and log file service 560 (e.g., Splunk®) may be used to determine whether the request should be blocked according to a block list or for other reasons as described above. An SMS hub receiver 524 and an SMS hub sender 550 may perform aspects similar to gateway manager 152 described above with respect to FIG. 1B. The courier service 526 communicates with the SMS hub sender 550 via courier routing service 548 to instruct the SMS hub provider 508 to transmit the message to the device 504 on the wireless network 502. A courier status service 546 may generate outbound message status indications according to aspects described herein (which may be stored in a message storage service 532 and/or provided to API customers 510 via push notifications 528). Thus, the aspects disclosed in FIG. 5B may be similar to aspects of method 300 discussed above with respect to FIG. 3.

Figure 6A:
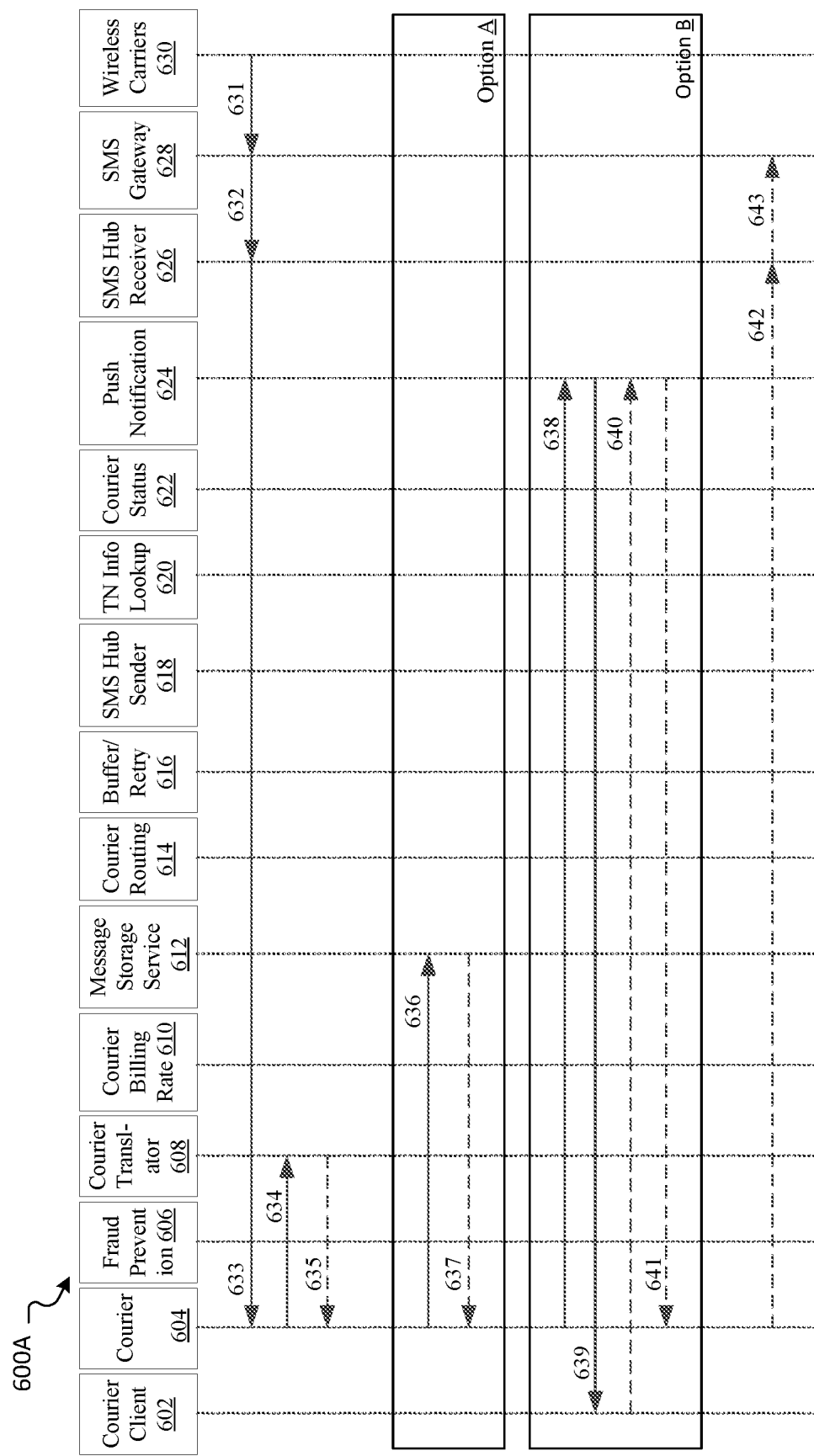
FIG. 6A illustrates an overview of an example communication flow for processing an inbound message according to aspects of the present disclosure.

FIG. 6A illustrates an example flow to process an inbound message according to aspects described herein. Solid lines in FIG. 6A represent request messages between components and dashed lines represent response messages to the requests. As illustrated, the flow occurs between wireless carriers 630 (e.g., which may provide service to recipients, such as messaging devices 108, 110, and/or 122 in FIG. 1A), an SMS gateway 628 (e.g., messaging gateway 106/120), an SMS hub receiver 626 (e.g., gateway manager 152 in FIG. 1B), a courier service 604 (e.g., message relay service 104), a message buffering and retry mechanism 616 (which may perform request buffering and to retry if one or more components are temporarily unavailable, labelled as "buffer/retry 616" in FIGS. 6A-B), a courier translator service 608 (e.g., customer information processor 154), a message storage service 612 (otherwise referred to as storage service 612), (e.g., message storage engine 158 and/or data store 116), a push notification 624 (e.g., push notification processor 156), and a courier client 602 (e.g., client device 102). Such aspects are similar to method 200 discussed with respect to FIG. 2.

For example, processing an inbound message may flow as follows. An inbound message may originate at a wireless carrier 630 and flow along arrow 631 to an SMS gateway 628. Flow may proceed along arrow 632 from the SMS gateway 628 to the SMS hub receiver 626, followed by flowing along arrow 633 from the SMS hub receiver 626 to a courier service 604. Flow then proceeds from the courier 604 to the courier translator service 608 along arrow 634 and back from the courier translator service 608 to the courier service 604 along arrow 635. If safestore is enabled at the receiving telephone number (e.g., storage of the message is enabled), then option A is included in the process where flow proceeds along arrows 636 and 637 from the courier service 604 to the message storage service 612 and back to the courier service 604 (e.g., storing the message in a data store). If inbound message notifications are enabled, then option B is included in the process. In option B, flow proceeds along arrows 638-641. At arrow 638, the courier service 602 communicates with push notification 624. At arrow 639 and arrow 640, flow proceeds from push notification 624 to the courier client 602 and then back to push notification service 624 to generate a notification of an inbound message. At arrow 641, flow proceeds from push notification 624 to the courier service 604. The process then flows along arrow 642 from the courier service 604 to the SMS hub receiver 626 and then along arrow 643 from the SMS hub receiver 626 to the SMS gateway 628 to deliver the inbound message.

Figure 6B:
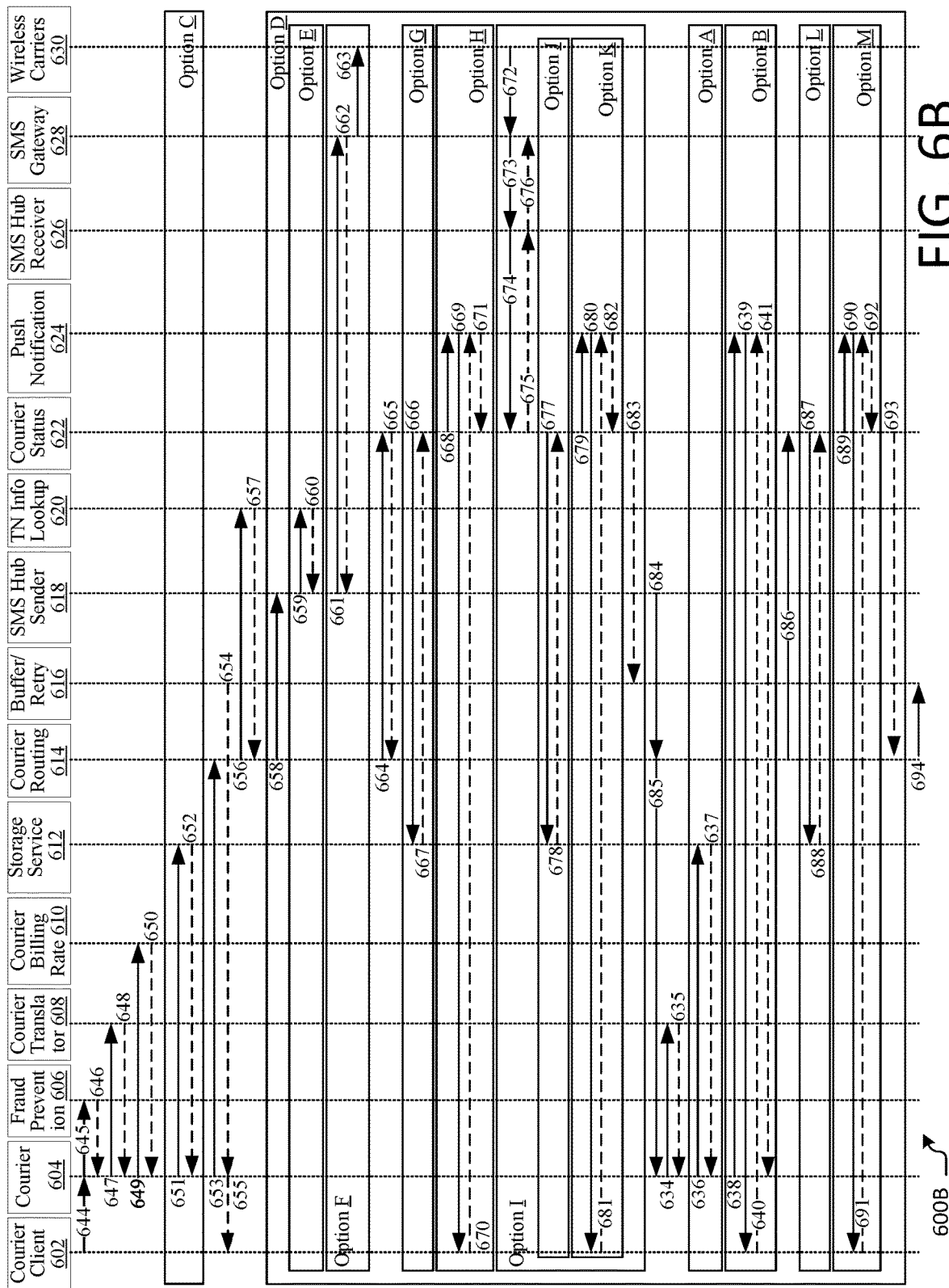
FIG. 6B illustrates an overview of an example communication flow for processing an outbound message according to aspects of the present disclosure.

Turning now to FIG. 6B, an example flow to process an outbound message is illustrated according to aspects described herein. FIG. 6B illustrates a flow between similar elements as discussed above with respect to FIGS. 5A, 5B, and 6A, which are therefore not described again below in detail. In addition to such elements, FIG. 6B further illustrates a telephone information lookup 620 (otherwise referred to TN info lookup 620), which may be used to determine whether a message recipient address is on-network (and can therefore be delivered without a wireless gateway, such as SMS hub or wireless gateway 106/120 in FIG. 1A). The TN info lookup 620 may further be used to determine details about what the target telephone number (TN) supports. As another example, the TN info lookup 620 is further used to determine a supported message length for a messaging system. Thus, such aspects are similar to method 300 discussed above with respect to FIG. 3.

For example, processing an outbound message may include flow along arrows shown in FIG. 6B. An outbound message may originate at a courier client 602 and be sent along arrow 644 to a courier service 604 and further along arrow 645 from the courier service 604 to a fraud prevention service 606. Flow may proceed along arrow 646 from the fraud prevention service 606 back to the courier service 604. At arrow 647, the courier service 604 may communicate with the courier translator service 608 to process customer information. After processing of customer information, flow continues back from the courier translator service 608 to the courier service 604 along arrow 648. At arrow 649 and arrow 650 flow proceeds from the courier service 604 to a courier billing rate service 610 and back to the courier service 604, respectively. If safestore is enabled (e.g., storage outbound messages is enabled), flow may proceed to option C where arrow 651 and arrow 652 demonstrate flow from the courier service 604 to the message storage service 612 and back, respectively, to store the message. At arrow 653, flow proceeds from the courier service 604 to courier routing service 614. Arrow 654 and arrow 655 show flow from the message buffering and retry mechanism 616 to the courier service 604 and from the courier service 604 to the courier client 602, respectively. At arrow 656, flow proceeds from courier routing service 614 to TN info lookup 620 to determine a service provider associated with the telephone number to which the outbound message is being sent, and at arrow 657 flow proceeds from TN info lookup 620 to courier routing service 614 after the service provider is determined.

If routing the outbound message to a wireless TN, flow continues through option D. If flow does not include option D, then the flow ends with arrow 607 flowing from the courier routing service 614 to the message buffering and retry mechanism 616. Alternatively, if option D is included, flow continues along at least arrows 658, 664, 665, 684, 685, 634, 635, 686, and 693. Additional arrows may be included in the flow process with the inclusion of options A, B, and E-M.

At arrow 658, flow proceeds from the courier routing service 614 to the SMS hub sender 618. Option E is included if the outbound message is long, to determine if the target TN (e.g., the TN to which the outbound message is being sent) is on a carrier that requires message splitting. Option E includes arrows 659 and 660 from the SMS hub sender 618 to the TN info lookup 620 and back to determine if message splitting is required for the outbound message.

If the outbound message requires splitting, as determined at option E, then flow proceeds to option F. Option F includes arrows 661-663. For each message part of a split outbound message, option F is repeated. For example, if an outbound message is split into three parts, arrows 661-663 are repeated three times, once for each part. There may be a one second delay between repeating option F for each part. At arrows 661 and 662, flow proceeds from the SMS hub sender 618 to the SMS gateway 628 and back, respectively. At arrow 663, flow proceeds from the SMS gateway 628 to the wireless carrier 630 to deliver the part of the outbound message.

At arrow 664 and arrow 665, flow proceeds from the courier routing service 614 to the courier status service 622 for disposition/call back of the sent outbound message (or its parts). If safestore is enabled flow proceeds to option G. At option G, an artifact may be associated with the stored outbound message at arrow 666 and arrow 667, where flow proceeds from the courier status service 622 to the message storage service 612 and back, respectively.

If delivery notifications are enabled, flow proceeds to option H. Option H includes arrows 668-671. At arrow 668, flow proceeds from the courier status service 622 to push notification 624. Arrow 669 and arrow 670 show flow from the push notification 624 to the courier client 602 and back, respectively to deliver a notification that the outbound message was sent. Flow then proceeds along arrow 671 from push notification 624 to the courier status service 622.

If a delivery confirmation is received, flow proceeds to option I. Option I includes arrows 672-676 and arrow 683, along with other arrows included in option J and option K. Option I may be limited to one occurrence. In an example where the outbound message is split into multiple parts, option I may proceed after receiving a delivery confirmation for the last part that was sent. At arrows 672, 673. And 674, flow proceeds from the wireless carrier 630 to the SMS gateway 628, from the SMS gateway 628 to the SMS hub receiver 626, and from the SMS hub receiver 626 to the courier status service 622, respectively. At arrow 675 and arrow 676, flow proceeds from courier status service 622 to the SMS hub receiver 626 and from the SMS hub receiver 626 to the SMS gateway, respectively.

If safestore is enabled, flow proceeds to option J. Option J includes arrow 677 and arrow 678. An artifact may be associated with the stored outbound message, where flow proceeds from the courier status service 622 to the message storage service 612 and back, respectively, at arrow 677 and arrow 678.

If delivery notifications are enabled, flow proceeds to option K. Option K includes arrows 679-682. At arrow 679, flow proceeds from the courier status service 622 to push notification 624. Arrow 680 and arrow 681 show flow from the push notification 624 to the courier client 602 and back, respectively, to deliver a notification that the outbound message was delivered. Flow then proceeds along arrow 682 from push notification 624 to the courier status service 622.

At arrow 683, flow proceeds from the courier status service 622 to the message buffering and retry mechanism 616. Flowing to arrow 684 and arrow 685, flow proceeds from the SMS hub sender 618 to courier routing service 614 and from courier routing service 614 to the courier service 604, respectively, to route the outbound message inbound to an on-net CTL endpoint. Flow then proceeds along arrows 634-641 (including option A and option B), as described in FIG. 5A for an inbound message.

At arrow 686, flow proceeds from the courier routing service 614 to the courier status service 622. If safestore is enabled, flow proceeds to option L. Option L includes arrow 687 and arrow 688, where flow proceeds from courier status service 622 to the message storage service 612 and from the message storage service 612 to courier status service 622, respectively, to store an artifact with the now inbound message.

If delivery notifications are enabled, flow proceeds to option M. Option M includes arrows 689-692. At arrow 689, flow proceeds from the courier status service 622 to push notification 624. Arrow 690 and arrow 691 show flow from the push notification 624 to the courier client 602 and back, respectively, to deliver a notification that the outbound message was delivered. Flow then proceeds along arrow 692 from push notification 624 to the courier status service 622. Following option K, at arrow 693, flow proceeds from the courier status service 622 to courier routing service 614.

After option D, flow proceeds to along arrow 694 from courier routing service 614 to the message buffering and retry mechanism 616.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
   at least one processor; and
   memory storing instructions that, when executed by the at least one processor, causes the system to perform a set of operations, the set of operations comprising:
      receiving an indication of an inbound message, the inbound message comprising a source address, a recipient address, and a message body;
      validating the indication based at least in part on a customer record and the recipient address;
      determining that the indication is valid and evaluating the customer record to determine whether to generate a push notification;
      determining to generate the push notification;
      determining a callback uniform resource locator (URL) from the customer record; and
      providing, to the callback URL, the push notification for the inbound message, the push notification comprising at least the source address and the message body.

2. The system of claim 1, wherein the set of operations further comprises:
   evaluating the customer record to determine whether to store the inbound message in a data store; and
   based on determining to store the inbound message in the data store, storing at least a part of the message in the data store.

3. The system of claim 2, wherein the at least the part of the inbound message is the whole message.

4. The system of claim 1, wherein the push notification is provided to a representational state transfer (REST) service associated with the callback URL.

5. The system of claim 1, wherein the set of operations further comprises:
   sending, to the source address, an indication that the inbound message was delivered to the recipient address.

6. A method for processing an inbound message for a customer of a message relay service, the method comprising:
   receiving an indication of the inbound message, the inbound message comprising a source address, a recipient address, and a message body;
   validating the indication based at least in part on a customer record and the recipient address;
   determining that the indication is valid and evaluating the customer record to determine whether to generate a push notification;
   determining to generate the push notification;
   determining a callback uniform resource locator (URL) from the customer record; and
   providing, to the callback URL, the push notification for the inbound message, the push notification comprising at least the source address and the message body.

7. The method of claim 6, further comprising:
   evaluating the customer record to determine whether to store the inbound message in a data store; and
   based on determining to store the inbound message in the data store, storing at least a part of the message in the data store.

8. The method of claim 7, wherein the at least the part of the inbound message is the whole message.

9. The method of claim 6, wherein the push notification is provided to a representational state transfer (REST) service associated with the callback URL.

10. The method of claim 6, the method further comprising:
    sending, to the source address, an indication that the inbound message was delivered to the recipient address.

* * * * *